Sept. 29, 1959     D. C. HANNAY ET AL     2,906,472
HOSE REEL WITH BRAKE
Filed Aug. 8, 1955     2 Sheets-Sheet 1
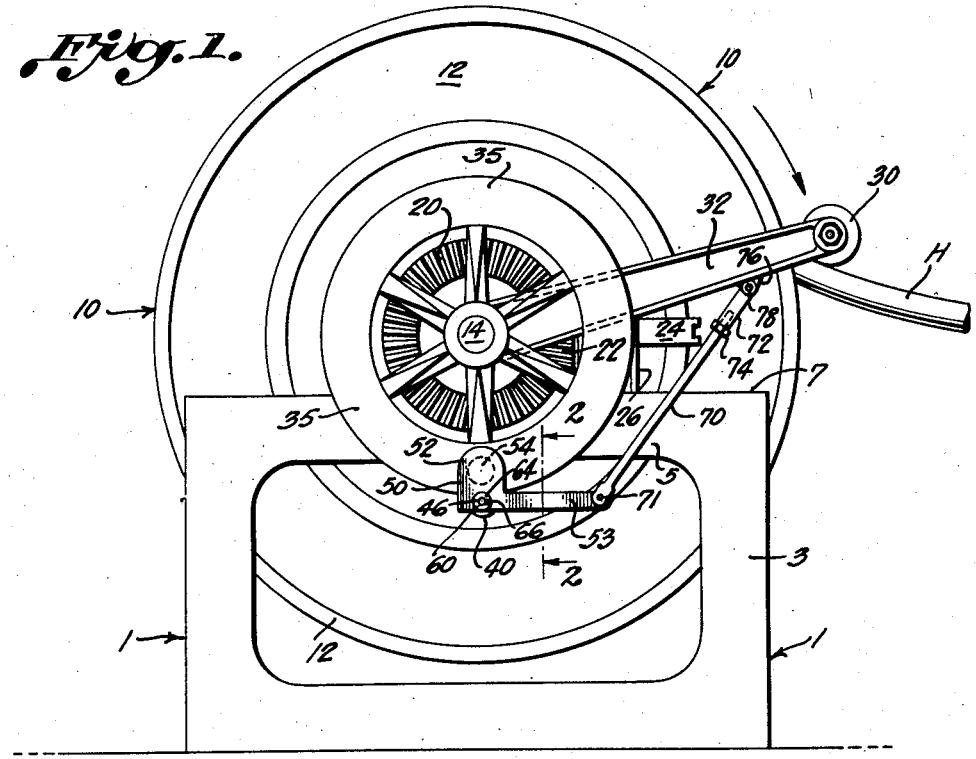
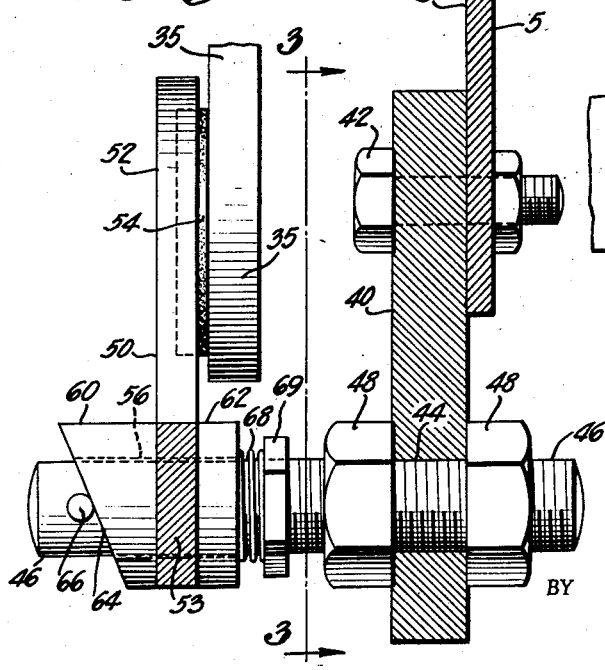
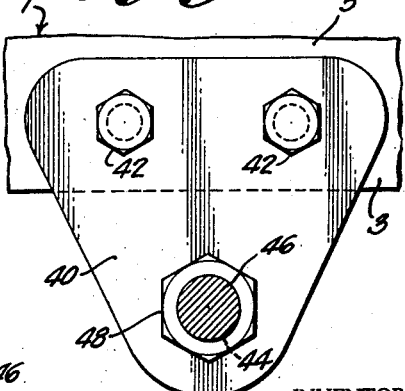
INVENTORS
DWIGHT C. HANNAY
GEORGE A. HANNAY
BY H. G. Lombard
ATTORNEY Sept. 29, 1959 D. C. HANNAY ET AL 2,906,472
HOSE REEL WITH BRAKE
Filed Aug. 8, 1955 2 Sheets-Sheet 2
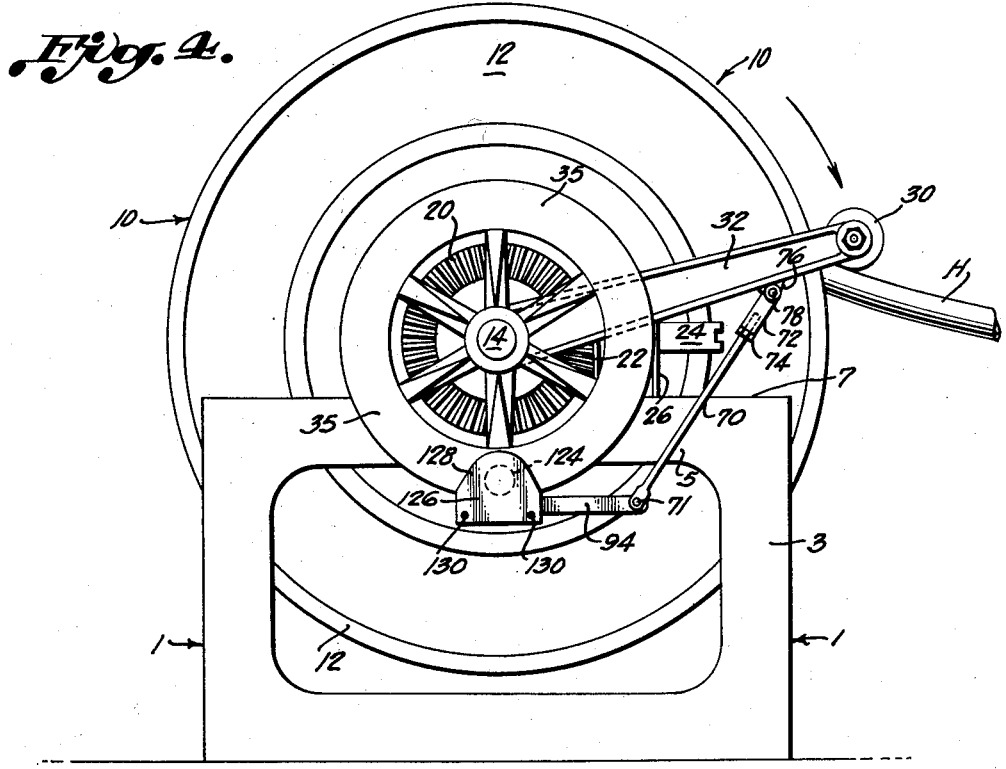
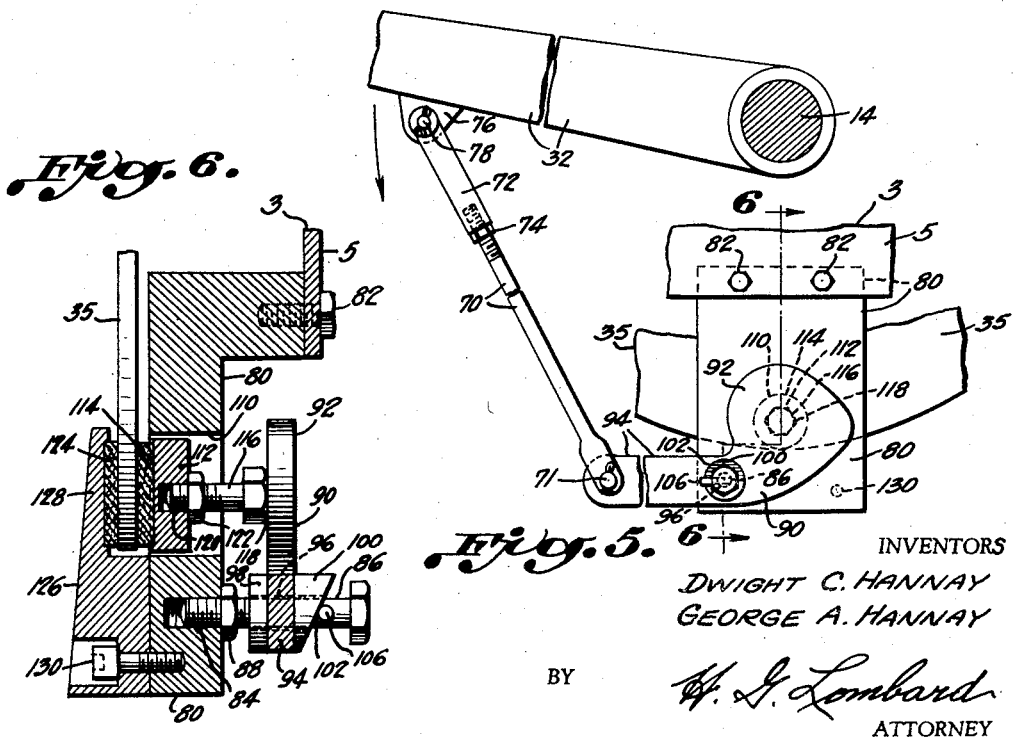
INVENTORS
DWIGHT C. HANNAY
GEORGE A. HANNAY
BY
H. G. Lombard
ATTORNEY United States Patent Office 2,906,472
Patented Sept. 29, 1959

2,906,472
HOSE REEL WITH BRAKE

Dwight C. Hannay and George A. Hannay, Westerlo, N.Y., assignors to Clifford B. Hannay and Son, Inc., Westerlo, N.Y., a corporation of New York Application August 8, 1955, Serial No. 526,964
3 Claims. (Cl. 242—99)

This invention relates in general to hose reels and similar reels for cable, rope, wire, and like lengths of material, and deals, more particularly, with an improved braking mechanism for such a reel by which an automatic braking and locking action is provided on the reel as soon as tension is relieved on the hose or other length of material that is pulled from the reel for any intended use thereof.

The improved braking mechanism for hose reels, and the like, in accordance with the invention, is readily employed on various types of reels of general utility, and has particular application and use as a braking and locking means for hose reels installed on fire trucks and crash trucks, for example, wherein it is necessary that the hose be always ready for use by quick and expeditious pulling thereof from the reel, and the momentum of the reel automatically stopped when the desired length of hose has been unwound therefrom in order to prevent overrunning of the reel and unnecessary unwinding of an excess amount of hose that would hamper operations in the vicinity thereof and otherwise require proportionately greater time and work to rewind the hose on the reel after use thereof.

A primary object of this invention, therefore, is to provide a hose reel, or the like, having an improved highly simplified braking mechanism for the purposes aforesaid, comprising a horizontal brake control bar that extends across the reel in contact with the hose and which is in direct connection with a brake shoe adapted to be actuated into engagement with a brake disc or drum secured on the reel supporting shaft, the arrangement being such that said control bar is operable when the hose is tensioned on being pulled from the reel to permit said brake shoe to assume a nonbraking relation, and with said control bar being otherwise operable when the hose is untensioned to actuate said brake shoe laterally into engagement with a side face of said brake disc or drum to provide an automatic braking and locking action on the reel.

A further object of the invention is to provide a hose reel, or the like, having such a braking mechanism in which the parts thereof are similar to attachments and comprise a horizontal brake control bar that extends across the front of the reel in contact with the hose and in direct connection with a broke shoe mounted on a side of the reel frame in the manner of an attachment and adapted to be actuated laterally into engagement with a side face of a brake disc or drum also provided in the manner of an attachment on an extension of the reel supporting shaft.

Another object of the invention is to provide a hose reel, or the like, and a braking mechanism therefor, as aforesaid, in which the laterally movable brake shoe is actuated by a brake lever pivotally mounted on the reel support at the side of the reel and connected by a brake rod to the horizontal control bar at the front of the reel in a manner whereby said control bar is operable when the hose is untensioned to actuate said brake shoe laterally under extraordinary force directly into positive engagement with a side face of the brake disc or drum to provide an automatic braking and locking action on the reel.

A further object of the invention is to provide a hose reel or similar reel and a braking mechanism therefor, such as described, in which the braking mechanism is provided in a highly simplified low cost construction comprising a brake shoe associated with a combined brake plate and cam member, with said cam member being operable in response to movement of said horizontal control bar to actuate said brake plate and thereby force said brake shoe laterally into braking engagement with a side face of said brake disc or drum.

Another object of the invention is to provide such a braking mechanism in which said laterally movable brake shoe is carried by said brake plate or in a separate housing adjacent said brake plate in position to be laterally actuated by the brake plate into engagement with a side face of the brake disc or drum to provide a braking action on the reel, as aforesaid, and further, with said brake shoe operating in conjunction with a cooperating brake shoe engaging the opposite side face of said brake disc or drum.

A further object of the invention is to provide a braking mechanism for a hose reel, or the like, embodying any one or more or all of the foregoing features of construction, and in which the aforesaid combined brake plate and cam member is pivotally mounted on a brake shaft secured to the side of the reel frame with said cam member engaging an abutment on said brake shaft and being moved thereby in response to movement of the horizontal control bar to operate said brake plate and thereby actuate said brake shoe laterally into even and uniform engagement with a side face of the brake disc or drum.

Further objects and advantages, and other new and useful features in the construction, arrangement and general combination of elements and parts of the invention will be apparent as the following description proceeds with reference to the accompanying drawings, for purposes of illustration but not of limitation, in which like reference characters designate like parts throughout, and in which:

Fig. 1 is a side elevational view of a typical hose reel, or the like, provided with a braking mechanism in accordance with the invention;

Fig. 2 is an enlarged sectional view of Fig. 1 along line 2—2, looking in the direction of the arrows, and shows in detail the elements of the braking mechanism in braking relation to the brake disc or drum carried on the reel supporting shaft; and, Fig. 3 is a sectional view of Fig. 2, on a reduced scale, as seen along line 3—3, looking in the direction of the arrows, and shows the highly simplified arrangement for mounting the braking mechanism on the side of the reel supporting frame.

Fig. 4 is a side elevational view of a hose reel, or the like, similar to Fig. 1, showing the same provided with another form of braking mechanism in accordance with the invention;

Fig. 5 is a sectional view of Fig. 4 along a vertical plane through the reel supporting shaft at the inner side of the braking mechanism, and shows in side elevation the details of the braking mechanism in this form of the invention; and, Fig. 6 is a sectional view of Fig. 5 along line 6—6, looking in the direction of the arrows.

Referring now, more particularly, to the drawings, both embodiments of the improved braking mechanism for a hose reel, or the like, in accordance with the invention, are disclosed by way of illustration only, as employed in what is commonly known as bucket box type of hose reel apparatus. It is to be understood, however, that neither embodiment of the invention is limited in any manner or form to the specific type of reel shown and the supporting frame therefor, but rather, is equally adaptable to a wide range and variety of other applications and uses in related types of hose reel fluid delivery apparatus, as well as reels for cable, rope, wire and similar lengths of material.

The supporting frame for the hose reel, designated generally 1, may be of any suitable character and in the present example is shown provided in a preferred form of an all-welded aluminum unit in a simplified and compact contruction which is both strong and relatively light in weight. The frame 1 comprises transverse bottom rails, or the like, connecting a pair of generally hollow side frame members 3 in the form of box-like designs each having an outer vertical wall 5 adjacent an inturned top flange 7 and similar inturned flanges extending around the periphery thereof in generally rectangular relation.

The hose reel, designated generally 10, comprises a pair of spaced discs 12 at each side of a central drum (not shown) having a well known conventional construction in which said drum is provided with a concealed L-shaped elbow that is connected at its inner end in communication with a source of fluid supplied through a tubular inlet end of the reel supporting shaft 14 extending axially through the center of said drum. The ends of the reel supporting shaft 14 preferably are provided in the manner of extensions which project beyond the discs 12 of the reel in position to be supported by a suitable bearing mounted on the top flange 7 on the side frame member 3 at each side of the reel supporting frame 1. The extension on the inlet end of the reel shaft is a tubular shaft portion provided with a suitable coupling for connection to the source of fluid, while the extension on the opposite end of said reel shaft 14, Fig. 1, preferably is a solid shaft portion of the required length for supporting the associated parts of the braking mechanism, as presently to be described.

The hose H is connected to the outlet end of said concealed elbow within the drum of the reel 10 to extend outwardly therefrom, and from this point is coiled within the reel 10 between the discs 12 in the usual manner in which such hose is wound upon the reel and is unwound therefrom when the free end of said hose H is pulled outwardly from the reel. A ring gear 20 is riveted or otherwise concentrically attached to the outer side of the reel disc 12 and in mesh therewith is a pinion 22 on a crank shaft 24 which is supported in a bracket 26 secured on the top flange 7 of the adjacent side frame member 3. The outer end of the crank shaft 24 extends free for engagement by a suitable crank to turn the pinion 22 and ring gear 20 and thereby rotate the reel 10 in rewinding the hose H thereon.

The hose reel and support therefor, or any similar reel apparatus for a cable, rope, wire, etc., is readily provided with the improved braking mechanism of the invention which comprises a horizontal control bar 30 in the form of a weighted guide roller, or the like, that extends across the front of the reel at a lower level than the surface of the drum within the reel 10 and the surfaces of the hose convolutions thereon so as to ride on said hose H as it is pulled from the reel 10 for use. The control bar 30 preferably is rotatably secured in the outer ends of a pair of brake arms 32, Fig. 1, positioned at opposite sides of the reel 10 and each provided with a suitable bearing on its rearward end loosely fitting the associated shaft end 14, without interfering with the required turning thereof whenever the reel 10 is rotated. A brake disc or drum 35 is fixedly mounted by a suitable key on the extremity of the shaft end 14 outwardly of the adjacent brake arm 32 and turns with said shaft end 14 on any rotation of the reel 10.

The braking mechanism, otherwise, involves a highly simplified, low cost construction that is relatively small and compact and thereby adapted to be inconspicuously mounted on the vertical side wall 5 of the side frame member 3 adjacent the brake disc 35, as illustrated in Fig. 2. The mounting of the braking mechanism in such position may be provided in any suitable way and in a preferred construction, a sturdy base member 40, Figs. 2 and 3, is secured at its upper end to the adjacent side wall 5 of the side frame member 3 by bolts 42. The lower end of said base member 40 is provided with a suitable bore 44, Fig. 2, defining a support for a brake shaft 46 having its inner end extending through said bore 44 and provided with threaded portions on opposite sides thereof carrying nuts 48 which clamp against the opposite sides of said base member 40 to secure said brake shaft 46 in mounted position. The arrangement is such that any required axial or circumferential adjustment of the brake shaft 46 may be obtained simply by loosening said nuts 48 as necessary to move said shaft 46 to the desired adjusted position where said nuts 48 are then tightened to secure said shaft 46 in such adjusted position.

The outer end of said brake shaft 46 serves as a spindle for pivotally mounting a combined brake block or brake plate and cam member 50 in operative relation to the outer face of the brake disc 35 as shown in Figs. 1 and 2. The member 50 preferably is formed as a one-piece forging or in any other suitable manner to define a brake plate 52 and an integral crank or lever 53 extending substantially at right angles thereto in the manner of a bell crank, or the like. The brake plate 52 is provided on its inner surface with a brake shoe 54 preferably in the form of a fibrous nonmetallic disc-like pad made of brake lining, or the like, and secured in a recess in said brake plate 52 by cement, rivets, or other suitable fastening means. Below the brake shoe 54, the member 50 is provided with an enlarged bearing 56, Fig. 2, extending through said plate portion 52 and tubular collars 60, 62, on opposite sides thereof. The collars 60, 62, define relatively wide, rigid bearing surfaces in a precision fit of the bearing 56 on the shaft 46 which insures an even, uniform pivotal movement of the brake plate 52 on said brake shaft 46 without flexing or distortion.

The outer collar 60 is of such length that the extremity thereof may be formed as an outwardly tapered cam 64 in engagement with an abutment defined by a radially projecting cam pin 66 which is riveted or otherwise secured in a transverse hole in said brake shaft 46. A coil spring 68 is telescoped over said brake shaft 46 between the inner collar 62 and a check nut 69 threaded on said brake shaft 46 and adjustable thereon as necessary to provide for suitable compression of said coil spring 68 when the brake is operated. The arrangement is such that in the braking position of the braking mechanism, the high portion of the cam 64 turns to a position engaging the cam pin 66, substantially as shown in Fig. 2, such that said cam 64 causes the brake plate 52 to slide inwardly axially of the brake shaft 46 to a position in which the brake shoe 54 thereon is forced into braking engagement with the adjacent outer face of the brake disc 35. During this inward braking movement of the brake plate 52, the coil spring 68 is compressed between the collar 62 and check nut 69. In a subsequent operation of the braking mechanism to nonbraking position, the cam 64 turns counter-clockwise such that the low portion of said cam is located opposite the pin 66, in which relation said cam 64 exerts little or no force on the brake plate 52 and there is sufficient play for the compressed coil spring 68 to expand and provide an instantaneous push against the collar 62 to urge the brake plate 52 outwardly as necessary to quickly disengage the brake shoe 54 from the brake disc 35.

The lever or crank 53 extending from the brake plate 52 is pivotally connected at its free end to a brake rod 70 by a pivot pin 71, Fig. 1, with said brake rod 70 extending diagonally outwardly and upwardly toward the front of the reel. The brake rod 70 is secured at its upper forward end to brake arm 32 in a pivoted connection which, preferably, is provided by a clevis type of terminal 72, Fig. 1, adapted to be adjusted to vary the effective length of said brake rod 70, as may be required. The clevis type of terminal 72 includes a bore in the lower end thereof threaded on the adjacent upper end of the brake rod 70 together with a lock nut 74 in an arrangement by which said terminal 72 and brake rod 70 may be turned relatively to each other for any required adjustment and locked in adjusted position by tightening said lock nut 74 against the adjacent end of said terminal 72. The opposite clevis end of said terminal 72 provides a detachable pivoted connection with an apertured ear 76 on the adjacent brake arm 32 and is connected thereto by a suitable pivot pin 78.

In the operation and use of the invention, it will be understood that whenever the reel 10 is at rest or is to stop turning after a required length of hose H has been pulled therefrom, the hose H is untensioned and the horizontal control bar 30 bearing on the hose automatically drops to its normal lowered or braking position under the combined weight of said control bar 30 and the brake arm 32 at each side of the reel 12, as aforesaid. This provides a pronounced downward axial force or push on the brake rod 70 through the associated brake arm 32 pivotally connected to the upper end of said brake rod 70. The brake rod 70 transmits a corresponding downward force on the lever or crank 53 which causes the combined brake plate and cam member 50 to rotate or turn clockwise on the brake shaft 46 such that the high portion of the cam 64 rides against the pin 66. The high portion of the cam 64 thus causes the brake plate 52 to slide axially inwardly on said brake shaft 46 in a manner whereby the brake shoe 54 on said brake plate 52 engages the adjacent face of the brake disc 35 under considerable force, as shown in Fig. 2, thereby providing the desired braking and locking action on the reel 10. When the reel 10 is at rest with the hose H fully wound thereon, this braking action is such that the reel 10 is actually locked against turning in the direction toward accidental or unintended unwinding of the hose H from the reel due, for example, to vibration and jarring effects, when carried on a fire truck or other vehicle. No other locking mechanism for the reel 10 is required such that the hose H is always in readiness to be pulled from the reel in the quickest possible time as required for fire fighting and other emergencies.

Accordingly, whenever the hose H is to be used, it may be easily and quickly pulled from the reel 10 without further preparation and drawn lengthwise until the required length of hose has been unwound from the reel. As the hose H is pulled from the reel and thereby tensioned, the tensioned hose lifts the control bar 30 from its lowered braking position to raised brake releasing position by which the brake plate 52 is moved outwardly as necessary for the brake shoe 54 thereon to disengage from the brake disc 35 in a reversal of the movement of the parts of the braking mechanism just described. Thus, as long as the hose H is tensioned on being pulled from the reel, the control bar 30 is maintained in said raised or brake releasing position in which said control bar 30 causes the brake arm 32 to lift the brake rod 70 which, in turn, lifts the lever or crank 53 to provide a counter-clockwise turning of the brake plate 52 by which the brake shoe 54 thereon moves out of engagement with the brake disc 35, thereby permitting the reel 10 to rotate at full speed as the hose H is unwound therefrom. The action is such that there is an instantaneous release of the brake disc 35 when the brake plate 52 is thus moved counter-clockwise, in which relation the cam 64 also moves counter-clockwise to a position in which the low portion of said cam 64 is opposite the pin 66, whereupon the coil spring 68 provides a pronounced outward push on the brake plate 52 and brake shoe 54 thereon to disengage said brake shoe 54 from the brake disc 35 in the nonbraking position of the braking mechanism, as aforesaid.

The pulling on the hose H is terminated, of course, when the required length of hose has been unwound from the reel, whereupon said hose immediately assumes an untensioned and slack condition wherein the hose is loosely disposed under the control bar 30 and thereby permits said control bar 30 to drop automatically to its lowered braking position in which the associated braking mechanism operates, as foresaid, to actuate the brake shoe 54 into direct and positive engagement with the adjacent face of the brake disc 35 to stop the momentum of the reel 10 and provide a positive braking and locking action thereon. The braking action is more or less instantaneous such that there is little or no overrunning of the reel 10 with unnecessary unwinding of an excess length of hose that would hamper operations and otherwise require that much more time and effort to rewind the hose on the reel.

The hose H is readily rewound on the reel through a suitable crank for turning the crank shaft 24, as aforesaid, with said control bar 30 held in raised or nonbraking position by said crank or other suitable supporting means as necessary to set the braking mechanism for disengaging the brake shoe 54 from the brake disc 35, as aforesaid, thereby permitting quick and easy rewinding of the hose H on the reel 10 without interference from the braking mechanism.

It will be understood that the direct and positive braking action of the brake shoe 54 with the brake disc 35 takes place through the aforesaid operation of the associated parts of the braking mechanism under the combined weight of the control bar 30 and the brake arm 32 connected thereto at each side of the reel 10. The control bar 30, as stated, is in the nature of a weighted guide roller, or the like, and accordingly, may be provided, for example, as a hollow tube filled with lead or other heavy material for any required weight to produce the necessary or desirable force for actuating the brake shoe 54 into engagement with the brake disc 35 in the most effective braking action.

While the invention is shown in Figs. 1–3, inclusive, with the braking mechanism so provided that the brake shoe 54 engages the outer face of the brake disc 35, the invention fully contemplates a construction in which the brake shoe 54 engages the inner face of said braking disc 35 by a more or less reverse arrangement of the parts of the braking mechanism in which the combined brake plate 52 and cam 64 and associated cam pin 66 are mounted on an inward intermediate portion of the brake shaft 46 with the coil spring 68 and check nut 69 on the outer end of said brake shaft 46. However, the construction shown in Figs. 1–3, inclusive, is preferable inasmuch as the cam actuated brake shoe 54 engages the outer face of the brake disc 35 to provide the desired braking action under an inward force which urges said braking disc 35 inwardly in the direction of its normal connection on the reel supporting shaft 14, thereby avoiding the need for any special connection of said brake disc 35 on said reel supporting shaft 14. The invention, otherwise, contemplates a construction such as just described in which the brake shoe 54 engages the inner face of the brake disc 35, together with the braking mechanism shown in Figs. 1–3, inclusive, to provide an arrangement wherein the braking action is provided by a pair of brake shoes 54 simultaneously engaging both the inner and outer faces of said brake disc 35 in the general manner illustrated in Fig. 6, for example.

Figs. 4–6, inclusive, disclose another form of braking mechanism in accordance with the invention which is generally similar to that described with reference to Figs. 1–3, inclusive, in the purpose, application and use therof. This form of the invention is employed in the same general organization on a hose reel, or the like, and comprises a pair of brake shoes which simultaneously engage opposite faces of the brake disc 35, as shown in Fig. 6, to provide a very pronounced, practically instantaneous braking action on the reel 10. This braking mechanism includes a similar base member 80 secured to the adjacent vertical wall 5 of the reel frame 3 by bolts 82. The lower portion of said base member 80 is provided with a bore 84 defining a support for a brake shaft 86 in the form of an inexpensive standard bolt adjustably threaded into said bore 84 and secured therein in adjusted position by a lock nut 88.

The free end of the brake shaft 86, likewise, serves as a spindle for pivotally mounting a similar combined brake plate and cam member 90 which preferably is formed as a one-piece forging, or the like, to define a brake plate 92 and a crank or lever 94 extending substantially at right angles thereto. An enlarged bearing 96 is provided at the intermediate portion of said member 90 substantially at the junction of the brake plate 92 and lever 94, with said bearing 96 extending through tubular collars 98, 100, on opposite sides of said member 90. The collars 98, 100, define relatively wide bearing surfaces in a precision fit of the bearing 96 on the brake shaft 86 which ensures an even, uniform pivotal movement of the brake plate 92 on said brake shaft 86 without flexing or distortion. The collar 100 is of such length that the extremity thereof may be formed as an outwardly tapered cam 102 which engages an abutment defined by a radially projecting cam pin 106 riveted or otherwise secured in a transverse hole in the brake shaft 86.

The base member 80 is formed with a substantially central cylindrical passage 110 defining a housing loosely receiving a cylindrical brake block 112 provided with a brake shoe 114 and adapted to carry said brake shoe 114 into and out of engagement with the adjacent inner face of the brake disc 35. Preferably the brake shoe 114 is a fibrous, nonmetallic disc-like pad made of brake lining, or the like, and secured in a recess in said brake block 112 by cement, rivets or other suitable fastening means. The brake block 112 is retained in the housing 110 in position for actuation by the brake plate 92 through an adjustable flat-headed bolt 116 threaded into a bore 120 in said brake block 112 and secured in adjusted position therein by a lock nut 122. The bolt 116 is so adjusted that the flat head 118 thereof is flush with the adjacent surface of the pivotally mounted brake plate 92 in an arrangement in which said brake plate 92 slides uniformly against said flat bolt head 118 during the braking movement in which said brake plate 92 pivots on the brake shaft 86 and is thereby forced inwardly by the high portion of cam 102, as shown in Fig. 2.

A similar disc-like brake shoe 124 is mounted in position to engage the outer face of the brake disc 35 in cooperation with the movable brake shoe 114 engageable with the inner face of said brake disc 35. This outer brake shoe 124 is supported by a flanged plate 126 having a projecting upper flange 128 provided on its inner face with a recess in which the brake shoe 124 is secured similarly to the inner brake shoe 114. The lower portion of said flanged plate 126 is provided with suitable holes for stud bolts 130, Fig. 6, securing the same to the lower end of the base member 80 with said brake shoe 124 in fixed directly opposed relation to the inner brake shoe 114 and having a normal slight spacing from the outer face of said brake disc 35.

The lever or crank 94 extending from the brake plate 92 is connected to the brake rod 70 and associated brake arm 32 in substantially the same construction described with reference to Figs. 1–3, inclusive. The generally similar arrangement, otherwise, is such that in a braking action of the braking mechanism, as aforesaid, the combined weight of the control bar 30 and brake arm 32 at each side of the reel 10 provides a pronounced downward axial force or push on the brake rod 70 which transmits a corresponding downward force on the lever or crank 94 to cause the combined brake plate 92 and cam 102 to pivot or turn on the brake shaft 86 and thereby move the high portion of said cam 102 against the pin 106; the high portion of the cam 102 thus forces the brake plate 92 to slide inwardly axially of the brake shaft 86 toward the inner face of the brake disc 35. As the brake plate 92 pivots and is simultaneously forced inwardly by the high portion of cam 102, said brake plate 92 slides against the flat head 118 of the bolt 116 to provide a corresponding inward movement on said bolt 116 and brake block 112 such that the brake shoe 114 is actuated under considerable force into direct and positive engagement with the adjacent inner face of the brake disc 35. The brake shoe 114 engages the brake disc 35 with such force that said brake disc 35 flexes outwardly to a degree wherein the outer face of said brake disc 35 is simultaneously engaged by the outer brake shoe 124 which thereby cooperates with the inner brake shoe 114 in providing the desired braking action on both faces of said brake disc 35 at the same time.

Likewise, whenever the hose H is to be used in this form of the invention, the hose may be easily and quickly pulled from the reel 10 without further preparation and drawn lengthwise until the required length of hose H has been unwound from the reel. As the hose H is pulled from the reel and thereby tensioned, the brake disc 35 rotates with the reel 10 and the tensioned hose H lifts the control bar 30 from its lowered braking position to raised brake releasing position wherein the brake arm 32 lifts the brake rod 70 which, in turn, lifts the lever or crank 94 to provide a reverse turning of the brake plate 92 and cam 102 to a position in which the low portion of said cam 102 is opposite the pin 106; in this relation, the low portion of said cam 102 exerts no force on said brake plate 92 and there is sufficient play to permit said brake plate 92 and the associated brake shoe 114 to move outwardly away from the brake disc 35 to a position in which said brake shoe 114 is completely out of engagement with the face of the brake disc 35. This is provided for by the arrangement in which the brake block 112 is loosely fitted in its housing 110, as aforesaid, such that the momentum of the rotating brake disc 35 acts in the nature of a centrifugal force on said brake block 112 and the brake shoe 114 thereon to throw said brake shoe 114 outwardly out of engagement with the brake disc 35 just as soon as the brake disc 35 commences to turn with the reel 10 when the hose H is pulled therefrom. In this connection, it is to be noted that the loose fitting of block 112 in housing 110 provides a space between the block and the walls of the housing, allowing initial movement of block 112 with disc 35 as soon as the cam acts to release release braking pressure. Block 112 then comes immediately into engagement with the wall of housing 110, and is thus brought to rest within the housing. When the inner brake shoe 114 thus disengages from the inner face of the rotating brake disc 35, the cooperating outer brake shoe 124 necessarily has no effective engagement with the outer face of said brake disc 35, such that said brake shoes 114 and 124 simultaneously disengage from the brake disc 35, easily and quickly, and thereby permit the reel 10 to rotate at full speed as the hose H is unwound therefrom.

When the required length of hose H has been unwound from the reel, there is no further pull on the hose H such that said hose immediately assumes an untensioned and slack condition wherein the hose is loosely disposed under the control bar 30 and thereby permits said control bar 30 to drop automatically to its lowered braking position in which the associated braking mechanism operates, as aforesaid, to actuate the brake shoes 114 and 124 into direct and positive engagement with the opposite faces of the brake disc 35 to stop the momentum of the reel 10 and provide a positive braking and locking action thereon. The operation and use of this form of the invention, otherwise, is substantially similar to that described with reference to the embodiment of Figs. 1–3, inclusive, including the arrangement for rewinding the hose H on the reel 10 through a suitable crank for turning the crank shaft 24, as aforesaid, with said control bar 30 held in raised or nonbraking position by said crank or other supporting means as necessary to provide for disengagement of the brake shoes 114, 124, from the brake disc 35 in order to permit quick and easy rewinding of the hose H on the reel 10 without interference from the braking mechanism.

While the invention has been described in detail with specific examples, such examples are intended as illustrations only, inasmuch as it will be apparent that other modifications in the construction, arrangement and general combination of parts of the hose reel and brake mechanisms therefor may be provided without departing from the spirit and scope of the invention. The present embodiments are therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed and desired to be secured by United States Letters Patent is:

1. In a reel apparatus of the type comprising a frame, a reel for a length of material to be reeled and unreeled, a shaft carried by said frame on which said reel is mounted, a horizontal brake control bar disposed to extend across the front of said reel in the path of the length of material when the length of material is pulled therefrom in unreeling, and a supporting arm pivotally mounted on said shaft to swing in a plane at right angles to the axis of the reel and supporting said bar at the front of the reel in a normally lowered position from which the bar is lifted by the length of material as the same is pulled from the reel and to which said bar returns when the length of material slackens, the combination of a brake disc mounted for rotation with said reel, a brake shaft fixedly mounted on said frame, a movable brake member pivotally mounted on said brake shaft and having two lever portions angularly displaced from each other in the direction in which said member pivots, means connecting one of said lever portions to said supporting arm, whereby said movable brake member is swung in one direction by upward movement of said supporting arm during unreeling of the length of material and in the opposite direction by downward movement of said supporting arm to its normally lowered position when the length of material slackens, a brake shoe operably arranged between said brake disc and the other of said lever portions of said movable brake member, and actuating means operatively associated with said movable brake member and responsive to movement of said movable brake member in said opposite direction for shifting said movable brake member toward said brake disc and thereby bringing said brake shoe into braking engagement with said disc.

2. In a reel apparatus of the type comprising a frame, a reel for a length of material to be reeled and unreeled, means mounting said reel rotatably on said frame, a horizontal brake control bar disposed to extend across the front of said reel in the path of the length of material when the length of material is pulled therefrom in unreeling, and a supporting arm pivotally mounted coaxially with said reel to swing in a plane at right angles to the axis of the reel and supporting said bar at the front of the reel in a normally lowered position from which the bar is lifted by the length of material as the same is pulled from the reel and to which said bar returns when the length of material slackens, the combination of a brake disc mounted for rotation with said reel, a fixed brake shaft mounted generally parallel to but spaced from the axis of rotation of said disc, a movable brake member freely mounted on said shaft for pivotal motion in a plane generally parallel to said disc and for reciprocatory motion toward and away from said disc, a housing member mounted on said frame between said disc and said movable brake member and provided with a bore aligned with the direction of the reciprocatory motion of said movable brake member, said bore having an open end adjacent said disc, brake shoe means disposed in said bore and provided with a friction surface facing said disc and with means extending in the opposite direction for engagement by said movable brake member, means interconnecting said movable brake member and said supporting arm whereby said movable brake member is pivoted in one direction in response to upward movement of said arm as the length of material is tensioned during unreeling and in the opposite direction in response to downward movement of said arm to its normally lowered position as the length of material slackens, and actuating means operatively associated with said movable brake member and effective to actuate the same toward said disc, thereby shifting said brake shoe means into engagement with the disc, when said movable brake member is pivoted in said opposite direction.

3. The apparatus of claim 2 wherein said brake shaft is mounted on said housing member, said actuating means comprises a cam and a follower fixed one to said brake shaft and the other to said movable brake member, and said brake shaft is axially adjustable with respect to said housing member.

References Cited in the file of this patent

UNITED STATES PATENTS

| | | |
|---|---|---|
| 1,443,093 | Sanderson | Jan. 23, 1923 |
| 1,469,284 | Strawn | Oct. 2, 1923 |
| 2,163,039 | Hinricher | June 20, 1939 |
| 2,234,310 | Maybach | Mar. 11, 1941 |
| 2,438,887 | Allen | Apr. 6, 1948 |
| 2,488,492 | Dumbleton | Nov. 15, 1949 |
| 2,596,428 | O'Malley | May 13, 1952 |
| 2,726,828 | Pashkow | Dec. 13, 1955 |